(12) United States Patent
Moon et al.

(10) Patent No.: US 8,423,542 B2
(45) Date of Patent: Apr. 16, 2013

(54) SYSTEM AND METHOD FOR EXTRACTING USERS OF SIMILAR INTERESTS BETWEEN VARIOUS TYPES OF WEB SERVERS

(75) Inventors: Sue Bok Moon, Daejon (KR); Hae Woon Kwak, Gwacheon-si (KR); Hwa Yong Shin, Seoul (KR); Jong Il Yoon, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 506 days.

(21) Appl. No.: 12/480,965

(22) Filed: Jun. 9, 2009

(65) Prior Publication Data

US 2010/0250557 A1    Sep. 30, 2010

(30) Foreign Application Priority Data

Mar. 24, 2009    (KR) .................. 10-2009-0025057

(51) Int. Cl.
 *G06F 17/30* (2006.01)
(52) U.S. Cl.
 USPC ........................... 707/732; 707/733; 707/734
(58) Field of Classification Search .................. 707/732, 707/733, 734
 See application file for complete search history.

(56) References Cited

U.S. PATENT DOCUMENTS

| | | | |
|---|---|---|---|
| 6,507,802 B1 | 1/2003 | Payton et al. | |
| 6,681,247 B1 | 1/2004 | Payton | |
| 6,745,178 B1 | 6/2004 | Emens et al. | |
| 6,934,407 B2 * | 8/2005 | Allouche | 382/128 |
| 6,941,345 B1 | 9/2005 | Kapil et al. | |
| 7,130,880 B1 | 10/2006 | Burton et al. | |
| 7,152,237 B2 | 12/2006 | Flickinger et al. | |
| 7,174,382 B2 | 2/2007 | Ramanathan et al. | |
| 7,334,021 B1 | 2/2008 | Fletcher | |
| 7,401,132 B1 | 7/2008 | Krumel et al. | |
| 7,410,440 B2 * | 8/2008 | Garcia et al. | 475/222 |
| 7,418,268 B1 | 8/2008 | Cabano et al. | |
| 7,426,472 B2 | 9/2008 | Fitzpatrick et al. | |
| 7,430,517 B1 | 9/2008 | Barton | |
| 7,434,169 B2 | 10/2008 | Quillen et al. | |
| 7,523,096 B2 | 4/2009 | Badros et al. | |
| 7,577,665 B2 | 8/2009 | Ramer et al. | |
| 7,593,933 B2 | 9/2009 | Sylvester et al. | |
| 7,603,413 B1 | 10/2009 | Herold et al. | |
| 7,606,772 B2 | 10/2009 | Flinn et al. | |
| 7,613,692 B2 | 11/2009 | Hamilton et al. | |
| 7,613,992 B1 | 11/2009 | Raichur et al. | |
| 7,614,081 B2 | 11/2009 | Prohel et al. | |
| 7,886,464 B2 * | 2/2011 | Holtz-Davis et al. | 40/6 |
| 7,941,468 B2 * | 5/2011 | Zellner et al. | 707/932 |
| 8,073,894 B1 * | 12/2011 | Dasgupta et al. | 708/819 |
| 8,166,056 B2 * | 4/2012 | Hong et al. | 707/756 |
| 2006/0149711 A1 * | 7/2006 | Zellner | 707/3 |

(Continued)

*Primary Examiner* — Baoquoc N To
(74) *Attorney, Agent, or Firm* — Rabin & Berdo, P.C.

(57) ABSTRACT

Disclosed herein is a system and method for extracting users of similar interests between various types of web servers. The system includes a user profile vector creation unit, a user similarity calculation unit, and a similar user extraction unit. The user profile vector creation unit collects tag data, performs standardization calculation on the degree of importance of each of one or more tags, and creates user profile vectors for respective users. The user similarity calculation unit calculates user similarity using the user profile vectors of the respective users created through the user profile vector creation unit. The similar user extraction unit extracts users of similar interests using the value of the user similarity calculated through the user similarity calculation unit.

15 Claims, 4 Drawing Sheets

U.S. PATENT DOCUMENTS

| | | | |
|---|---|---|---|
| 2007/0054271 A1* | 3/2007 | Polyak et al. | 435/6 |
| 2007/0078958 A1* | 4/2007 | Bennett | 709/223 |
| 2007/0219040 A1* | 9/2007 | Garcia et al. | 475/220 |
| 2008/0109376 A1* | 5/2008 | Walsh et al. | 705/80 |
| 2008/0177773 A1* | 7/2008 | Boss et al. | 707/102 |
| 2008/0201320 A1* | 8/2008 | Hong et al. | 707/5 |
| 2009/0100078 A1* | 4/2009 | Lai et al. | 707/100 |
| 2009/0178309 A1* | 7/2009 | Holtz-Davis et al. | 40/6 |
| 2010/0010790 A1* | 1/2010 | Anerousis et al. | 703/6 |
| 2010/0023506 A1* | 1/2010 | Sahni et al. | 707/5 |
| 2010/0205543 A1* | 8/2010 | Von Werther et al. | 715/753 |
| 2010/0250557 A1* | 9/2010 | Moon et al. | 707/749 |
| 2010/0251337 A1* | 9/2010 | Amsterdam et al. | 726/4 |
| 2011/0094131 A1* | 4/2011 | Holtz-Davis et al. | 40/6 |

* cited by examiner

FIG. 2

CATEGORY
- 전체보기(1137)
- 팝스페일리 日
- 꽃혔다_더피
- 캐롤라인_제임스모리슨
- 귀여우주의_조나스브라더스
- 음흉다운_CLASSIC
- 나는 한국인_가요 N
- 부위기자네_재즈
- 이생구라간+좋은글
- 뜨거리갑팝_이페트들
- 혼자진지한감상기
- 뮤시안만한합작넘들
- 문예올고죽고_벗자리운세
- 명병자리

TAGS 최근인기
음악,조나스브라더스,레이디가가,테일러스위프트,LAD YGYGA,다미,마일리사이러스,카녀에웨스트,니콜나스,벗자리운세,스노우페트롤,스티,연예인,꽃미남,벗도자트,금방자리, ▷모두보기

TAG DATA

RECENT COMMENT ⌃
◦ WBC 배네주엘라 슘 ∞

---

ALBUM OF THE YEAR:"RISING SAND"(ROBERT PLANT &ALISON KRAUSS)
올해의 앨범상: 라이징 샌드(로버트 플랜트 &앨리슨 크라우스)

RECORD OF THE YEAR:"PLEASE READ THE LETTER"(ROBERT PLANT & ALISON KRAUSS)
올해의 레코드상:플리즈 리드 더 레터(로버트 플랜트&앨리슨 크라우스)

SONG OF THE YEAR:"VIVA LA VIDA"(COLDPLAY)
올해의 노래상:비바 라 비다(콜드플레이)

BEST NEW ARTIST:"ADELE"
최우수 신인상:아델

BEST POP COLLABORATION WITH VOCALS:"RICH WOMAN"(ROBERT PLANT&ALISON KRAUSS)
최우수 팝 협연상:리치우먼(로버트 플레트&앨리슨 크라우스)

BEST POP VOCAL ALBUM:"ROCKFERRY"(DUFFY)
최우수 팝 보컬 앨범상:락페리(더피)

BEST MALE R&B VOCAL PERFORMANCE:"MISS INDEPENDENT"(NE-YO)
최우수 남자 R&B 보컬상:미스 인디펜던트 (니요)

SYSTEM AND METHOD FOR EXTRACTING USERS OF SIMILAR INTERESTS BETWEEN VARIOUS TYPES OF WEB SERVERS

PRIORITY

This application claims priority to a Korean patent application filed on Mar. 24, 2009 and assigned Korean Patent Application No. 10-2009-0025057; the entire contents of which are incorporated herein by reference.

BACKGROUND

1. Technical Field

The present disclosure relates generally to a system and method for extracting users of similar interests between various types of web servers, and, more particularly, to a system and method for extracting users of similar interests between various types of web servers, which is capable of standardizing the degree of importance of each tag based on content tags issued by the service users of independently operated web servers, creating user profiles for the degree of similarity between the interests of the users, and extracting users of similar interests based on the created user profiles.

2. Description of the Related Art

Currently, the number of web services operated based on content created by users, like the blog and moving image services of portal web sites, is increasing in Korea. In other countries, there have already been a number of leading companies participating in the growth trend of Web 2.0.

Furthermore, in connection with user content creation services, the need for services recommending users of similar interests is on the rise. The number of services which recommend the users of web services which support tagging as users of similar interests is increasing.

However, these existing services have the limitation of limitedly recommending users of similar interests only within the boundary of each of the web services.

SUMMARY

An object of the present disclosure is to provide a system and method for extracting users of similar interests between various types of web servers, which is capable of standardizing the degrees of importance of respective tags based on content tags issued by the service users of independently operated web servers, creating user profiles for the degree of similarity between the interests of the users, and extracting and recommending users of similar interests based on the created user profiles.

In order to accomplish the above object, the present disclosure provides a system for extracting users of similar interests between various types of web servers, including a user profile vector creation unit for collecting tag data, performing standardization calculation on the degree of importance of each of one or more tags, and creating user profile vectors for respective users; a user similarity calculation unit for calculating user similarity using the user profile vectors of the respective users created through the user profile vector creation unit; and a similar user extraction unit for extracting users of similar interests using the value of the user similarity calculated through the user similarity calculation unit.

Additionally, in order to accomplish the above object, the present disclosure provides a method of extracting users of similar interests between various types of web servers, including the steps of: (a) a user profile vector creation unit collecting tag data, performing standardization calculation on the degree of importance of each of one or more tags, and creating user profile vectors for respective users; (b) a user similarity calculation unit calculating user similarity using the user profile vectors of the users created through the user profile vector creation unit; (c) the similar user extraction unit determining whether a similarity value between two users calculated through the user similarity calculation unit is equal to or greater than a predetermined threshold value; and (d) if, as a result of the determination at the step (c), the similarity value is equal to or greater than the predetermined threshold value, the similar user extraction unit determining the two users to be users of similar interests and extracting the two users.

BRIEF DESCRIPTION OF THE DRAWINGS

The above and other objects, features and advantages of the present disclosure will be more clearly understood from the following detailed description taken in conjunction with the accompanying drawings, in which:

FIG. 2 is a diagram showing an embodiment of tag data used by users in the services of various types of web servers according to the present disclosure;

DESCRIPTION OF THE PREFERRED EMBODIMENTS

Figure 1:
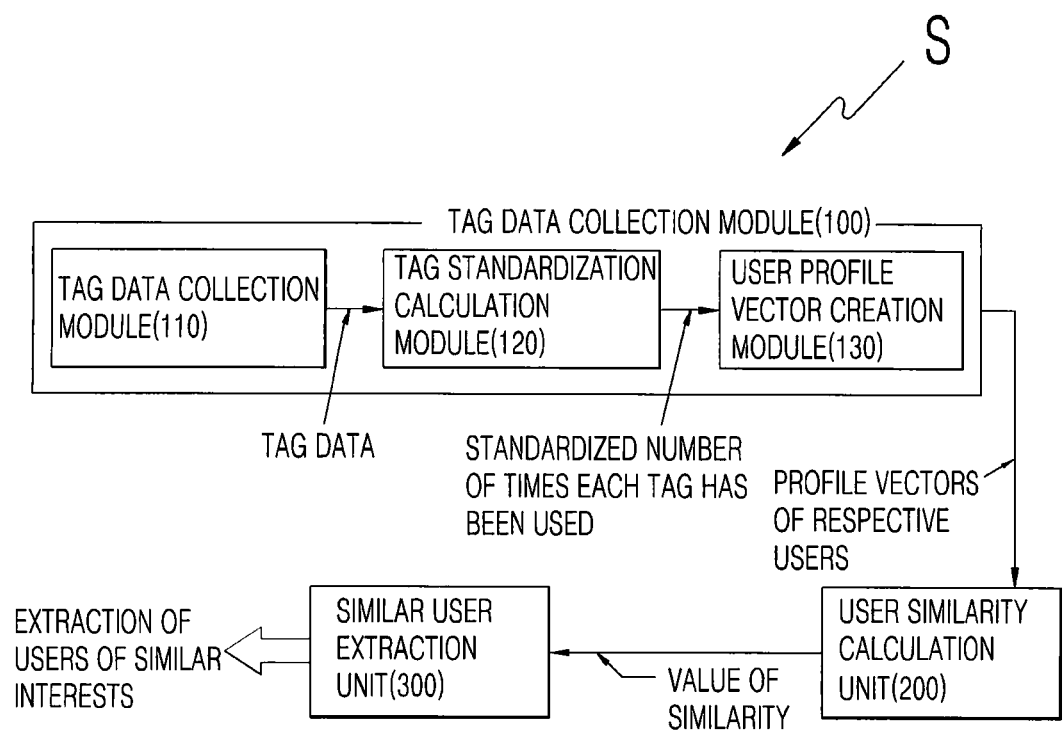
FIG. 1 is a conceptual diagram showing the construction of the system for extracting users of similar interests between various types of web servers according to the present disclosure.

Reference now should be made to the drawings, in which the same reference numerals are used throughout the different drawings to designate the same or similar components.

Prior to providing the following description of the present disclosure, it should be noted that if detailed descriptions of well-known functions or constructions related to the present disclosure may unnecessarily make the gist of the present disclosure obscure, the detailed descriptions will be omitted.

The present disclosure will be described in detail below with reference to the accompanying drawings.

A system for extracting users of similar interests between various types of web servers according to the present disclosure will be described below with reference to FIGS. 1 and 2.

FIG. 1 is a conceptual diagram showing the configuration of the system S for extracting users of similar interests between various types of web servers according to the present disclosure. As shown in this drawing, the system for extracting users of similar interests between various types of web servers includes a user profile vector creation unit 100, a user similarity calculation unit 200, and a similar user extraction unit 300.

The user profile vector creation unit 100 functions to collect tag data, that is, basic data, perform standardization calculation on the degree of importance of each tag, and create a profile vector for each user based on calculated standardized information. The user profile vector creation unit 100, as shown in FIG. 1, includes a tag data collection module 110, a tag standardization calculation module 120, and a user profile vector creation module 130.

In detail, the tag data collection module 110 functions to collect tag data used by individual users in the services of various types of web servers in conjunction with the web servers, as shown in FIG. 2, like common web search engines.

Here, the tag data is data that has been used to create various types of content, such as music, diaries, bookmarks, photos and/or moving images, by the users in the web services. The tag data includes tags and the numbers of times the tags have been used.

Accordingly, in the case of user (U1, U2, ... Un−1, Un) and tag (T1, T2, ... Tn−1, Tn), the number of times user U1 has used tag T1 is denoted as |U1(T1)|.

The tag standardization calculation module 120 functions to, using the tag data collected using the tag data collection module 110, standardize the numbers of times each user has used tags and calculate the standardized number of times each of the tags has been used.

Assuming that user U1 has used tags T1, T2, ... Tn−1, and Tn, the numbers of times user U1 has used the tags are given by the following Equation (1), and the value thereof is referred to as the user's individual standardization dividend.

$$\sum_{i=1}^{n} |U1(Ti)| \quad (1)$$

Furthermore, the tag standardization calculation module 120 calculates the standardized number of times each tag has been used as the ratio of the number of times the tag has been used to a standardized dividend.

That is, when the number of times user U1 has used tag T1 is |U1(T1)| and the standardization dividend in the case where user U1 has used tags T1, T2, ... Tn−1, and Tn is $$\sum_{i=1}^{n} |U1(Ti)|$$

as given by Equation (1), the standardized number of times user U1 has used tag T1 is calculated by the following Equation (2):

$$\frac{|U1(T1)|}{\sum_{i=1}^{n} |U1(Ti)|} \quad (2)$$

The user profile vector creation module 130 functions to create a user profile vector based on the standardized numbers of times the tags have been used, which are calculated using the tag standardization calculation module 120.

Here, the user profile vector is a value having a number of dimensions equal to the number of types of tags used by each user, and has the standardized numbers of times the tags have been used as its elements.

That is, when user U1 has used tags T1, T2, ... Tn−1, and Tn, the user U1's profile vector is given by the following Equation (3):

$$\vec{U1} = \left( \frac{|U1(T1)|}{\sum_{i=1}^{n} |U1(Ti)|}, \frac{|U1(T2)|}{\sum_{i=1}^{n} |U1(Ti)|}, \ldots, \frac{|U1(Tn-1)|}{\sum_{i=1}^{n} |U1(Ti)|}, \frac{|U1(Tn)|}{\sum_{i=1}^{n} |U1(Ti)|} \right) \quad (3)$$

When user U1 has used three types of tags as described above, a user profile vector has three dimensions including three elements.

Furthermore, the user similarity calculation unit 200 functions to calculate user similarity using respective users' profile vectors created using the user profile vector creation unit 100.

Here, the user similarity is a value defined between two users, and a value obtained by calculating the cosine product of the user profile vectors of two users. The cosine product of two vectors A and B is given by the following Equation (4):

$$\text{similarity} = \cos(\theta) = \frac{A \cdot B}{\|A\| \|B\|} \quad (4)$$

Here, in a user profile vector, each tag represents one dimension. Accordingly, if there is no identical tag, the value of the cosine product is 0 (minimum). In contrast, if the user profile vectors of the two users are identical to each other, the value is 1 (maximum). Furthermore, as the user profile vectors of the two users become more similar, the value becomes closer to 1.

Furthermore, the similar user extraction unit 300 functions to extract users of similar interests using the user similarity value calculated through the user similarity calculation unit 200.

That is, the similar user extraction unit 300 determines whether a similarity value between two users calculated through the user similarity calculation unit 200 is equal to or greater than a predetermined threshold value (T-value), and, if the similarity value is equal to or greater than the predetermined threshold value, determines the two users to be users of similar interests and extracts the two users. Here, the predetermined threshold value is greater than 0 and less than 1.

A method of extracting users of similar interests using the above-described system S for extracting users of similar interests between various types of web servers will be described below with reference to FIGS. 3 and 4.

Figure 3:
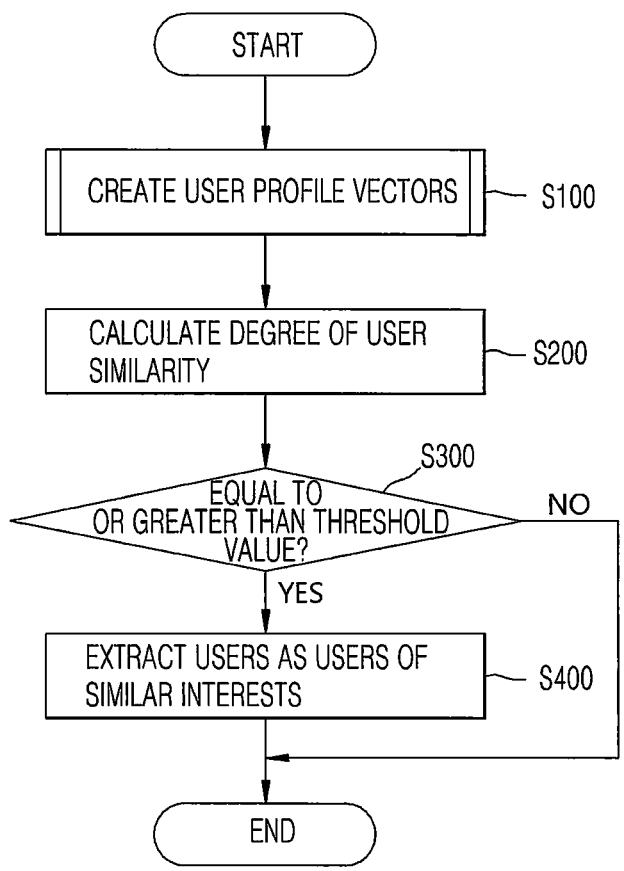
FIG. 3 is an overall flowchart showing a method of extracting users of similar interests between various types of web servers according to the present disclosure.
Figure 4:
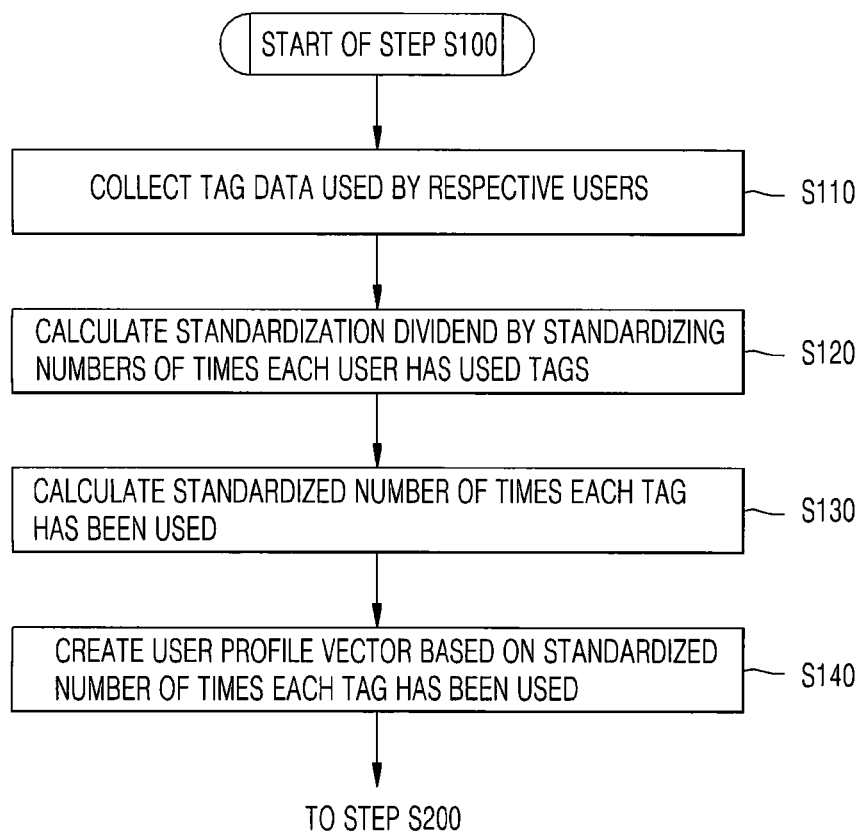
FIG. 4 is a detailed flowchart showing the step S100 of creating a user profile vector according to the present disclosure.

FIG. 3 is an overall flowchart showing the method of extracting users of similar interests between various types of web servers according to the present disclosure, and FIG. 4 is a detailed flowchart showing the step S100 of creating user profile vectors according to the present disclosure.

As shown in FIG. 3, the user profile vector creation unit 100 collects tag data, performs standardization calculation on the degree of importance of each tag, and creates a profile vector for each user based on calculated standardization information at step S100.

In detail, at step S100, as shown in FIG. 4, the tag data collection module 110 of the user profile vector creation unit 100 collects tag data used by individual users in the services of various types of web servers at step S110.

Thereafter, the tag standardization calculation module 120 calculates a standardization dividend by standardizing the numbers of times each user has used tags using Equation (1) at step S120, and the standardized number of times each of the tags has been used using Equation 2 as the ratio of the number of times the tag has been used to a standardization dividend at step S130.

Furthermore, the user profile vector creation module 130 creates a user profile vector using Equation 3 based on the standardized numbers of times the tags have been used, which are calculated through the tag standardization calculation module 120, at step S140.

Thereafter, the user similarity calculation unit 200, as shown in the FIG. 3, calculates user similarity using the profile vectors of respective users created through the user profile vector creation module 130 of the user profile vector creation unit 100 at step S200.

That is, the user similarity calculation unit 200 calculates user similarity by calculating the cosine product of the user profile vectors of two users using Equation 4. In this case, as described above, if there is no identical tag, the value of the cosine product is 0. In contrast, if the user profile vectors of the two users are identical to each other, the value is 1.

Thereafter, the similar user extraction unit 300, as shown in FIG. 3, determines whether the similarity value between the two users calculated through the user similarity calculation unit 200 is equal to or greater than a predetermined threshold value at step S300.

Thereafter, if, as a result of the determination at step S300, the value is equal to or greater than the predetermined threshold value, the similar user extraction unit 300 determines the two users to be users of similar interests and extracts the two users at step S400. In contrast, if the value is neither equal to nor greater than the predetermined threshold value, the similar user extraction unit 300 terminates the process.

The above-described present disclosure has the effect in which a user of any web service supporting tagging can extract and recommend users of similar interests, beyond the limitation in which the existing services can limitedly extract and recommend users of similar interests only within each of the web server services.

Moreover, the present disclosure has the effect of enabling user recommendation and exchanges between various services, thereby promoting all of the web services and improving users' experiences.

Although the preferred embodiments of the present disclosure have been disclosed for illustrative purposes, those skilled in the art will appreciate that various modifications, additions and substitutions are possible, without departing from the scope and spirit of the present disclosure as set forth in the accompanying claims.

What is claimed is:

1. A system for receiving data from a plurality of web servers and for extracting and recommending users of similar interests between the plurality of web servers, comprising:
    a user profile vector creation unit for collecting tag data from the plurality of web servers, performing standardization calculation on a degree of importance of each of one or more tags, and creating user profile vectors for respective users;
    a user similarity calculation unit for calculating user similarity between the respective users using the user profile vectors of the respective users created through the user profile vector creation unit; and
    a similar user extraction unit for extracting at least two users of similar interests using a value of the user similarity calculated through the user similarity calculation unit, wherein at least a first user of the at least two users is recommended to a second user of the at least two users.

2. The system as set forth in claim 1, wherein the user profile vector creation unit comprises:
    a tag data collection module for collecting the tag data used by the users in services of various types of web servers in conjunction with the various types of web servers;
    a tag standardization calculation module for, using the tag data collected through the tag data collection module, standardizing numbers of times each of the users has used the tags and calculating the standardized number of times each of the tags has been used; and
    a user profile vector creation module for creating the user profile vectors of the users based on the standardized numbers of times the tags have been used, which are calculated through the tag standardization calculation module.

3. The system as set forth in claim 2, wherein the tag standardization calculation module performs, when user U1 has used tag T1, T2 and T3, the standardization calculation on the number of times the user U1 has used the tags using the following Equation $$\sum_{i=1}^{n} |U1(Ti)| \quad (1)$$

4. The system as set forth in claim 2, wherein the tag standardization calculation module calculates, when user U1 has used tags T1, T2, . . . Tn−1, and Tn, the standardized number of times user U1 has used tag T1 using the following Equation (2):

$$\frac{|U1(T1)|}{\sum_{i=1}^{n} |U1(Ti)|} \quad (2)$$

5. The system as set forth in claim 2, wherein each of the user profile vectors is a value having a number of dimensions equal to the number of types of tags used by each of the users, and has the standardized numbers of times the tags have been used as its elements.

6. The system as set forth in claim 2, wherein the user profile vector creation module calculates, when user U1 has used tags T1, T2, . . . Tn−1, and Tn, a profile vector of the user U1 using the following Equation (3):

$$\vec{U1} = \left( \frac{|U1(T1)|}{\sum_{i=1}^{n} |U1(Ti)|}, \frac{|U1(T2)|}{\sum_{i=1}^{n} |U1(Ti)|}, \ldots, \frac{|U1(Tn-1)|}{\sum_{i=1}^{n} |U1(Ti)|}, \frac{|U1(Tn)|}{\sum_{i=1}^{n} |U1(Ti)|} \right) \quad (3)$$

7. The system as set forth in claim 1, wherein the user similarity calculation unit calculates the user similarity using the following Equation (4), which is a product of cosine vectors of user profile vectors of two users:

$$\text{similarity} = \cos(\theta) = \frac{A \cdot B}{\|A\| \|B\|} \quad (4)$$

8. The system as set forth in claim 7, wherein the user similarity calculation unit calculates the user similarity of the two users as 0 if there is no tag in common between the two users and as 1 if the user profile vectors of the two users are identical to each other.

9. The system as set forth in claim 1, wherein the similar user extraction unit determines whether a similarity value between two users calculated through the user similarity calculation unit is equal to or greater than a predetermined threshold value, and, if the similarity value is equal to or greater than the predetermined threshold value, determines the two users to be users of similar interests and extracts the two users.

10. The system as set forth in claim 9, wherein the predetermined threshold value is a value greater than 0 and less than 1.

11. The system as set forth in claim 1, wherein the tag data is data that has been used to create various types of content, such as music, one or more diaries, one or more bookmarks, one or more photos and/or one or more moving images, by the users in the web services, and the tag data includes the tags and the numbers of times the tags have been used.

12. The system as set forth in claim 1, wherein a first of the plurality of web servers corresponds to a first search engine and a second of the plurality of web servers corresponds to a second search engine.

13. A method of extracting and recommending users of similar interests between various types of web servers, comprising the steps of:
(a) a user profile vector creation unit collecting tag data, performing standardization calculation on a degree of importance of each of one or more tags, and creating user profile vectors for respective users;
(b) a user similarity calculation unit calculating user similarity using the user profile vectors of the respective users created through the user profile vector creation unit;
(c) the similar user extraction unit determining whether a similarity value between at least two users calculated through the user similarity calculation unit is equal to or greater than a predetermined threshold value; and
(d) if, as a result of the determination at the step (c), the similarity value is equal to or greater than the predetermined threshold value, the similar user extraction unit determining the at least two users to be users of similar interests and extracting the at least two users and recommending at least a first user of the at least two users to a second user of the at least two users.

14. The method as set forth in claim 13, wherein the step (a) comprises the steps of:
(a-1) the user profile vector creation unit collecting the tag data used by the users in services of the various types of web servers;
(a-2) the user profile vector creation unit calculating a standardization dividend by standardizing a number of times each of the users has used the tags;
(a-3) the user profile vector creation unit calculating the standardized number of times each of the tags has been used as the ratio of the number of times each of the tags has been used to the standardization dividend; and
(a-4) the user profile vector creation unit calculating the user profile vector based on the standardized number of times each of the tags has been used, which is calculated at the step (a-3).

15. The method as set forth in claim 13, further comprising the step (d-1) of, if as a result of the determination at step (c), the similarity value is neither equal to nor greater than the predetermined threshold value, the similar user extraction unit terminating a process.

* * * * *